(12) United States Patent
Saito (10) Patent No.: US 10,834,012 B2
(45) Date of Patent: Nov. 10, 2020

(54) DEVICE AND METHOD SUPPORTING VIRTUAL RESOURCE COMBINATION DECISIONS

(71) Applicant: International Business Machines Corporation, Armonk, NY (US)

(72) Inventor: Akihiro Saito, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 794 days.

(21) Appl. No.: 14/020,926

(22) Filed: Sep. 9, 2013

(65) Prior Publication Data

US 2014/0108659 A1 Apr. 17, 2014

(30) Foreign Application Priority Data

Oct. 11, 2012 (JP) .................................. 2012-225975

(51) Int. Cl.
*H04L 12/911* (2013.01)
*H04L 12/24* (2006.01)

(52) U.S. Cl.
CPC .......... *H04L 47/70* (2013.01); *H04L 41/0806* (2013.01)

(58) Field of Classification Search
CPC ......... H04L 41/00; H04L 43/00; H04L 51/00; H04L 61/00; H04L 65/00; H04L 67/00; H04L 69/00; H04L 67/02; H04L 67/1095; H04L 67/34; H04L 12/5695; H04L 2012/5631; H04L 47/70; H04L 41/0806; H04L 29/08171; H04L 41/5054; H04L 47/788; H04L 47/822; H04L 47/823; H04L 63/10; H04L 67/10; H04L 67/1002; H04L 67/101; H04L 67/1012; H04L 67/1029;

(Continued)

(56) References Cited

U.S. PATENT DOCUMENTS 7,657,580 B2 * 2/2010 Choquier et al. ............. 709/226
8,396,807 B1 * 3/2013 Yemini ................. G06F 9/5077
705/400
8,615,579 B1 * 12/2013 Vincent et al. ............... 709/224

(Continued)

FOREIGN PATENT DOCUMENTS

CN 102156665 A 8/2011
CN 102236582 A 11/2011

(Continued)

*Primary Examiner* — Wing F Chan
*Assistant Examiner* — Billy H Ng
(74) *Attorney, Agent, or Firm* — Cuenot, Forsthye & Kim, LLC (57) ABSTRACT

Supporting combination decisions of virtual resources to be located in a single physical resource includes acquiring change status information indicating a change in each of a plurality of virtual resources designated as virtual resource candidates to be located in a single physical resource and determining, using a processor, whether a high correlation exists between changes in the loads of each of the plurality of virtual resources indicated in the change status information by performing statistical processing on the change status information. A suitability of locating the plurality of virtual resources in a single physical resource is determined according to the determination of whether a high correlation exists.

18 Claims, 9 Drawing Sheets

(58) Field of Classification Search
CPC ... H04L 67/1078; H04L 67/28; H04L 67/303; G06F 17/30873; G06Q 30/02
See application file for complete search history.

(56) References Cited

U.S. PATENT DOCUMENTS

| | | | |
|---|---|---|---|
| 2004/0143664 A1* | 7/2004 | Usa | G06F 9/5077 709/226 |
| 2005/0262173 A1 | 11/2005 | Choquier et al. | |
| 2011/0302578 A1* | 12/2011 | Isci | G06F 9/5077 718/1 |
| 2012/0096460 A1* | 4/2012 | Sekiguchi et al. | 718/1 |

FOREIGN PATENT DOCUMENTS

| | | |
|---|---|---|
| CN | 102541662 A | 7/2012 |
| CN | 102696000 A | 9/2012 |
| CN | 103731466 A | 4/2014 |
| JP | 2004199561 A | 7/2004 |
| JP | 2005100387 A | 4/2005 |
| JP | 2010238044 A | 10/2010 |
| JP | 2010244181 A | 10/2010 |
| JP | 2011191807 A | 9/2011 |
| JP | 2012094019 | 5/2012 |
| JP | 2014078160 A | 5/2014 |

\* cited by examiner

| | 8/10 | 11 | 14 | 15 | 16 | 17 | 18 | 21 | 22 | 23 | 24 | 25 | 28 | 29 | 30 | 31 | 9/1 | 4 | 5 | 6 | 7 | 8 |
|---|---|---|---|---|---|---|---|---|---|---|---|---|---|---|---|---|---|---|---|---|---|---|
| A. File print | N/A | + | − | − | − | + | + | − | − | + | − | | | | − | − | − | − | + | − | + | − |
| B. Accounting operations | N/A | + | + | + | − | + | + | − | − | + | + | + | − | + | + | − | − | + | − | − | + | + |
| C. Web-based operations | N/A | − | + | − | + | + | + | + | + | − | + | − | − | − | + | + | − | + | − | + | + | + |
| D. Period-specific operations | N/A | + | − | | | − | + | | | − | + | | | + | | | + | + | + | + | − | − |
| E. Internal operations | N/A | + | + | − | | − | + | + | − | − | + | | | + | − | | − | + | + | + | − | − |

FIG. 3

| (B,C) | 8/10 | 11 | 14 | 15 | 16 | 17 | 18 | 21 | 22 | 23 | 24 | 25 | 28 | 29 | 30 | 31 | 9/1 | 4 | 5 | 6 | 7 | 8 |
|---|---|---|---|---|---|---|---|---|---|---|---|---|---|---|---|---|---|---|---|---|---|---|
| N/A | − | + | − | − | + | + | − | − | − | + | − | + | − | + | − | + | + | + | − | + | + |

FIG. 4

| | 8/10 | 11 | 14 | 15 | 16 | 17 | 18 | 21 | 22 | 23 | 24 | 25 | 28 | 29 | 30 | 31 | 9/1 | 4 | 5 | 6 | 7 | 8 |
|---|---|---|---|---|---|---|---|---|---|---|---|---|---|---|---|---|---|---|---|---|---|---|
| A. File print | − | − | − | − | − | + | + | + | + | + | + |  | + | + | + | + | − | − | + | − | − | − |
| B. Accounting operations | − | − | + | + | + | + | + | + | − | − | + | + | + | + | + | − | − | − | − | − | − | − |
| C. Web-based operations | + | + | + | − | + | + | + | + | + | + | + | + | − | − | − | − | − | − | − | − | − | − |
| D. Period-specific operations | − | + | + |  |  |  |  |  |  |  |  |  |  | + | − | − | − | − | − | − | − | − |
| E. Internal operations | − | + | + | + | − | − | − | + | − | − | + |  | + | + | − | − | − | − | + | + | + | + |

FIG. 5

| (B,C) | 8/10 | 11 | 14 | 15 | 16 | 17 | 18 | 21 | 22 | 23 | 24 | 25 | 28 | 29 | 30 | 31 | 9/1 | 4 | 5 | 6 | 7 | 8 |
|---|---|---|---|---|---|---|---|---|---|---|---|---|---|---|---|---|---|---|---|---|---|---|
|  | − | − | + | − | + | + | + | + | − | − | + | + | − | − | − | + | + | + | + | + | + | + |

|   | A | B | C | D | E |
|---|---|---|---|---|---|
| A |   | OK | NG | OK | OK |
| B | OK |   | OK | OK | NG |
| C | NG | OK |   | OK | OK |
| D | OK | OK | OK |   | OK |
| E | OK | NG | OK | OK |   |

DEVICE AND METHOD SUPPORTING VIRTUAL RESOURCE COMBINATION DECISIONS

CROSS-REFERENCE TO RELATED APPLICATIONS

This application claims the benefit of Japan Application Number 2012-225975 filed on Oct. 11, 2012, which is fully incorporated herein by reference.

BACKGROUND

In cloud computing, there is an idea known as provisioning. In provisioning, virtual IT resources (referred to below as virtual resources) are dynamically allocated to physical IT resources (referred to below as physical resources) based on user requests. Provisioning has already been widely adopted because IT systems can be quickly and flexibly constructed even in business situations with large load fluctuations.

However, in provisioning, there is the issue of determining which virtual resources are to be located in which physical resource. More specifically, there is the issue of determining which virtual servers are to be located in which physical server. Several methods have been proposed for optimizing placement. One technique involves a load correlation determined for each virtual machine; the relative maximum load capacity of each virtual machine is predicted from the correlation; combinations are established for each virtual machine so that the total of each virtual machine server at the predicted maximum load capacity for each virtual machine does not exceed the allowable load capacity of the virtual machine servers; and each virtual machine is allocated in accordance with the calculated combinations.

Other techniques relate to the placement of virtual servers in physical servers in which virtual servers are moved between different physical servers. For example, one technique involves taking over the statistical information and operational information after a virtual server has been moved, and the virtual server continues to be monitored.

BRIEF SUMMARY

A method of supporting combination decisions of virtual resources to be located in a single physical resource includes acquiring change status information indicating a change in each of a plurality of virtual resources designated as virtual resource candidates to be located in a single physical resource and determining, using a processor, whether a high correlation exists between changes in the loads of each of the plurality of virtual resources indicated in the change status information by performing statistical processing on the change status information. The method further includes determining a suitability of locating the plurality of virtual resources in a single physical resource according to the determination of whether a high correlation exists.

A system for supporting combination decisions of virtual resources to be located in a single physical resource includes a processor. The processor is programmed to initiate executable operations. The executable operations include acquiring change status information indicating a change in each of a plurality of virtual resources designated as virtual resource candidates to be located in a single physical resource and determining whether a high correlation exists between changes in the loads of each of the plurality of virtual resources indicated in the change status information by performing statistical processing on the change status information. The executable operations further include determining a suitability of locating the plurality of virtual resources in a single physical resource according to the determination of whether a high correlation exists.

A computer program product for supporting combination decisions of virtual resources to be located in a single physical resource includes a computer readable storage medium having program code stored thereon. The program code is executable by a processor to perform a method. The method includes acquiring, using the processor, change status information indicating a change in each of a plurality of virtual resources designated as virtual resource candidates to be located in a single physical resource and determining, using the processor, whether a high correlation exists between changes in the loads of each of the plurality of virtual resources indicated in the change status information by performing statistical processing on the change status information. The method further includes determining, using the processor, the suitability of locating the plurality of virtual resources in a single physical resource according to the determination of whether a high correlation exists.

DETAILED DESCRIPTION

The present invention relates to a device and method supporting combination decisions for virtual resources. The present invention relates more specifically to a device and method supporting combination decisions of virtual resources to be located in a single physical resource.

As mentioned above, many techniques have been proposed to optimize the placement of virtual servers in physical servers. However, referring to some techniques, business processing capacity declines when a load spike occurs. Therefore, when such a technique is applied to cloud computing, it is difficult to maintain a certain service level, which impedes further migration of basic operations to the cloud.

Other techniques, as noted, are effective at monitoring virtual servers, but do not optimize the placement of virtual servers in physical servers.

An object of the embodiments of the present invention is to find the proper allocation of virtual resources relative to a physical resource so that business processing capacity does not decline even when a load spike occurs.

In order to achieve this object, embodiments of the present invention provide a device supporting combination decisions of virtual resources to be located in a single physical resource, in which the device includes: an acquisition unit for acquiring change status information indicating a change in each of a plurality of virtual resources designated as virtual resource candidates to be located in a single physical resource; a determination unit for determining whether or not there is a high correlation between changes in the loads of each of the plurality of virtual resources indicated in the change status information by performing statistical processing on the change status information acquired by the acquisition unit; and a processing unit for performing at least one of a process of determining the suitability of locating a plurality of virtual resources in a single physical resource when it has been determined by the determination unit that there is not a high correlation between changes in the loads of each of the plurality of virtual resources, or a process of determining the unsuitability of locating a plurality of virtual resources in a single physical resource when it has been determined by the determination unit that there is a high correlation between changes in the loads of each of the plurality of virtual resources.

Here, the acquisition unit may acquire change status information indicating the direction of change in each load of a plurality of virtual resources, and the determination unit may determine whether or not there is a high correlation between the directions of change in each load of the plurality of virtual resources by referencing the occurrences of a rise or a fall in the directions of change among each load of the plurality of virtual resources indicated in the change status information acquired by the acquisition unit. In this situation, the determination unit may determine that there is a high correlation between the directions of change in each load of a plurality of virtual resources when the direction of change in the loads of some of the plurality of virtual resources is in the rising direction during the same period of time, the direction of change in the loads of some of the plurality of virtual resources is in the falling direction during the same period of time, and the occurrence of either exceeds a predetermined reference. Also, the acquisition unit may acquire change status information indicating the values after a change in each of the loads of a plurality of virtual resources, and the determination unit may determine whether or not there is a high correlation between the values after the change in each of the loads of the plurality of virtual resources by referencing the occurrences between values after the change in each of the loads of the plurality of virtual resources indicated in the change status information acquired by the acquisition unit which are greater than a predetermined typical value and are less than a predetermined typical value. In this situation, the determination unit may determine that there is a high correlation between the values after the change in each of the loads of the plurality of virtual resources when some values after the change in each of the loads of the plurality of virtual resources are greater than a predetermined typical value during the same period of time, some values after the change in each of the loads of the plurality of virtual resources are less than a predetermined typical value during the same period of time, and the occurrences of either exceed a predetermined reference.

Embodiments of the present invention also provide a device supporting combination decisions of virtual servers to be located in a single physical server, in which the device includes: a first acquisition unit for acquiring change direction information indicating the change in direction of each load of a plurality of virtual servers designated as virtual server candidates to be located in a single physical server; a second acquisition unit for acquiring post-change value information indicating the values after changes in each of the loads of the plurality of virtual servers; a first determination unit for determining whether or not there is a high linkage in the direction of change in each of the loads of the plurality of virtual servers by referencing the occurrences of a rise and fall in loads among the directions in change in each of the loads of the plurality of virtual servers indicated in the change in direction information acquired by the first acquisition unit; a second determination unit for determining whether or not there is a high linkage in the direction of change in each of the loads of the plurality of virtual servers by referencing the occurrences between values after the change in each of the loads of the plurality of virtual servers indicated in the post-change value information acquired by the second acquisition unit which are greater than a predetermined typical value and are less than a predetermined typical value; and an output unit for outputting information indicating the suitability of locating a plurality of virtual servers in a single physical server when the first determination unit has determined that there is not a high linkage in the change direction of each of the loads of the plurality of virtual servers or when the second determination unit determines that there is not a high linkage in the values after changes in the plurality of virtual servers, and for outputting information indicating the unsuitability of locating a plurality of virtual servers in a single physical server when the first determination unit has determined that there is a high linkage in the change direction of each of the loads of the plurality of virtual servers or when the second determination unit determines that there is a high linkage in the values after changes in the plurality of virtual servers.

In addition, embodiments of the present invention include a method supporting combination decisions of virtual resources to be located in a single physical resource, in which the method includes: acquiring change status information indicating a change in each of a plurality of virtual resources designated as virtual resource candidates to be located in a single physical resource; determining whether or not there is a high correlation between changes in the loads of each of the plurality of virtual resources indicated in the change status information by performing statistical processing on the acquired change status information; and performing at least one of a process of determining the suitability of locating a plurality of virtual resources in a single physical resource when it has been determined that there is not a high correlation between changes in the loads of each of the plurality of virtual resources, or a process of determining the unsuitability of locating a plurality of virtual resources in a single physical resource when it has been determined that there is a high correlation between changes in the loads of each of the plurality of virtual resources.

Embodiments of the present invention also include program causing a computer to function as a device supporting combination decisions of virtual resources to be located in a single physical resource, the program causing the computer to function as: an acquisition unit for acquiring change status information indicating a change in each of a plurality of virtual resources designated as virtual resource candidates to be located in a single physical resource; a determination unit for determining whether or not there is a high correlation between changes in the loads of each of the plurality of virtual resources indicated in the change status information by performing statistical processing on the change status information acquired by the acquisition unit; and a processing unit for performing at least one of a process of determining the suitability of locating a plurality of virtual resources in a single physical resource when it has been determined by the determination unit that there is not a high correlation between changes in the loads of each of the plurality of virtual resources, or a process of determining the unsuitability of locating a plurality of virtual resources in a single physical resource when it has been determined by the determination unit that there is a high correlation between changes in the loads of each of the plurality of virtual resources.

Embodiments of the present invention are able to find the proper allocation of virtual resources relative to a physical resource so that business processing capacity does not decline even when a load spike occurs.

The following is a detailed description of an embodiment of the present invention with reference to the appended drawings. In the present embodiment, any virtual resource can be applied to any physical resource when, for example, virtual switches are located in physical switches, or when virtual storage is located in physical storage. In the example explained here, virtual servers are placed in physical servers. Because a single business operation is usually performed by a single virtual server, a virtual server is equivalent to the operation it performs and can be referred to by that operation, and the physical servers can be referred to simply as servers.

First, an overview of the present embodiment will be provided. In the present embodiment, combinations of operations are sought which minimize the possibility of a concurrent load spike occurring when the operations are located in the same physical server. For example, when the load of all operations is highest each morning at 9 AM, performance problems are obviously very likely to occur when these operations are located in the same physical server. This is because these operations have a high load change correlation.

However, such an obvious correlation is rare. Usually, the load change correlation between different operations is not readily apparent. When dynamic elements are added to link services, such as in the cloud or service-oriented architecture (SOA), the correlation can be even more difficult to determine. In the present embodiment, the load change correlation is usually determined from server monitoring information, and safe combinations of operations with low correlation (low linkage, high independence) are located in the same physical server to minimize the likelihood of performance problems.

The following is an explanation of an allocation decision support device 10 which realizes these functions. In the following explanation, a correlation which is higher than a predetermined reference is sometimes referred to as "correlated", and a correlation which is lower than a predetermined reference is sometimes referred to as "uncorrelated".

Figure 1:
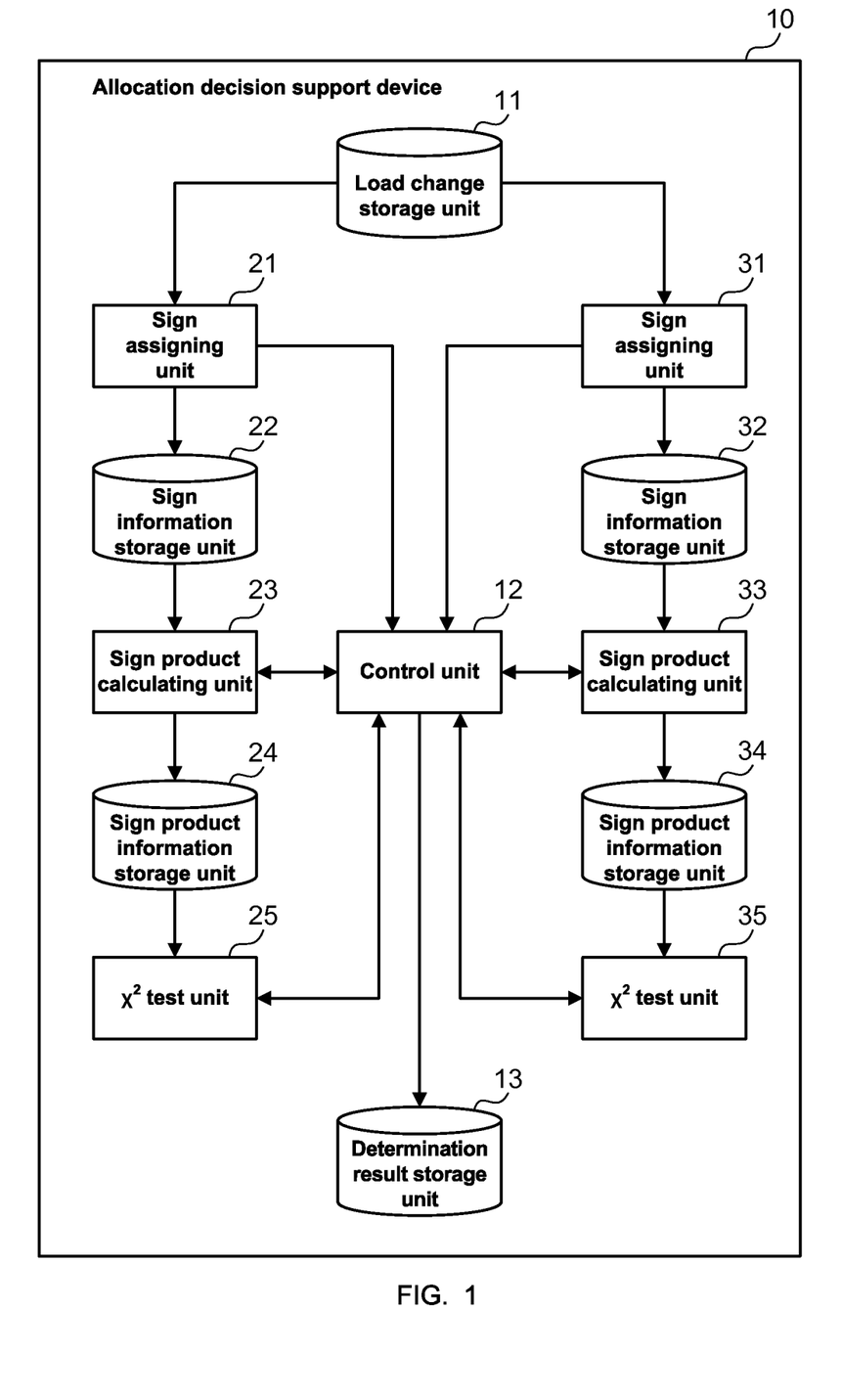
FIG. 1 is a block diagram showing a configuration example of the allocation decision support device in an embodiment of the present invention.

First, the configuration of the allocation decision support device 10 will be explained. FIG. 1 is a block diagram showing a configuration example of the allocation decision support device 10. As shown in the drawing, the allocation decision support device 10 has a load change storage unit 11, a control unit 12, and a determination result storage unit 13. It also has a sign assigning unit 21, a sign information storage unit 22, a sign product calculating unit 23, a sign product information storage unit 24, and an $\chi 2$ test unit 25. It also has a sign assigning unit 31, a sign information storage unit 32, a sign product calculating unit 33, a sign product information storage unit 34, and an $\chi 2$ test unit 35.

The load change storage unit 11 stores the load changes of the plurality of operations undertaken during the actual time of server operation. Here, an operation load change is information indicating how the load of CPU, memory, network and disk changed as an operation was executed.

The control unit 12 selects two operations from the plurality of operations, has the sign product calculating unit 23 and $\chi 2$ test unit 25 determine whether the load changes of the two operations are correlated, and has the sign product calculating unit 33 and the $\chi 2$ test unit 35 again determine whether or not the load changes between the two operations are correlated when a correlation is determined. When they are determined to be uncorrelated, information is outputted indicating that the two operations may be placed in the same server. When they are determined to be correlated, information is outputted indicating that the two operations should not be placed in the same server. The control unit 12 in the present embodiment is an example of a processing unit which determines the suitability of locating a plurality of virtual resources in a single physical resource when it has been determined there is not a high correlation between changes in the loads of each of the plurality of virtual resources, and/or determines the unsuitability of locating a plurality of virtual resources in a single physical resource when it has been determined that there is a high correlation between changes in the loads of each of the plurality of virtual resources. The control unit 12 may also serve as an output unit which outputs information indicating the suitability of locating a plurality of virtual servers in a single physical server when it has determined that there is not a high linkage in the change direction of each of the loads of the plurality of virtual servers or when the second determination unit determines that there is not a high linkage in the values after changes in the plurality of virtual servers, and/or outputs information indicating the unsuitability of locating a plurality of virtual resources in a single physical server when it has determined that there is a high linkage in the change direction of each of the loads of the plurality of virtual servers or when it determines that there is a high linkage in the values after changes in the plurality of virtual servers.

The determination result storage unit 13 stores information on all combinations of two operations among the plurality of operations indicating that two operations outputted by the control unit 12 may be placed in the same server, or information indicating that the two operations should not be placed in the same server.

The sign assigning unit 21 generates sign information corresponding to the plurality of operations by assigning a sign to the load change in the plurality of operations stored in the load change storage unit 11. More specifically, a sign is assigned to the load change of each operation every hour based on whether the load value of each operation has risen or fallen relative to the load value of a previous time. For example, (+) is assigned when the load value has risen, and (−) is assigned when the load value has fallen. The signs generated in this manner are referred to below as load vector signs. In the present embodiment, the sign information is used as an example of change status information indicating a change in the load of each of a plurality of virtual resources, and the sign assigning unit 21 is an example of an acquisition unit for acquiring change status information. The sign information consisting of sign vector signs is also an example of change direction information indicating the change direction of each load of a plurality of virtual servers, and the sign assigning unit 21 is also an example of a first acquisition unit for acquiring change direction information.

The sign information storage unit 22 stores the sign information corresponding to the plurality of operations generated by the sign assigning unit 21.

The sign product calculating unit 23 extracts from the sign information corresponding to the plurality of operations stored in the sign information storage unit 22 the sign information corresponding to the two operations selected by the control unit 12, and generates sign product information by calculating the product of the load vector signs in the sign information corresponding to each operation. The sign product is (+) when the load vector sign of one operation is (+) and the load vector sign of the other operation is (+) and when the load vector sign of one operation is (−) and the load vector sign of the other operation is (−). The sign product is (−) when the load vector sign of one operation is (+) and the load vector sign of the other operation is (−). In the present embodiment, the calculation of the product of the load vector signs is an example of the process of referencing the occurrences of a rise or a fall in the direction of change of each load.

The sign product information storage unit 24 stores the sign product information generated by the sign product calculating unit 23.

The $\chi 2$ test unit 25 performs an $\chi 2$ test on the sign product information stored in the sign product information storage unit 24. In other words, it performs a test to determine whether or not there is a large discrepancy in the number of (+) and (−) signs in the sign product information. When the test value exceeds a predetermined reference, information indicating a correlation is returned to the control unit 12. When the test value does not exceed the predetermined reference, information indicating no correlation is returned to the control unit 12. In the present embodiment, the $\chi 2$ test unit 25 is an example of a determination unit for determining whether or not there is a high correlation between changes in the loads of each of a plurality of virtual resources, or a first determination unit for determining whether or not there is a high linkage in the direction of change in each of the loads of a plurality of virtual servers. The $\chi 2$ test is performed using the following equation.

$$\chi^2 = \sum \frac{(\text{observed} - \text{expected})^2}{\text{expected}} \qquad \text{Equation 1}$$

Here, 'observed' indicates in relation to (+) the number of (+) signs that has actually occurred, and indicates in relation to (−) the number of (−) signs that has actually occurred. Also, 'expected' indicates in relation to (+) the number of (+) signs that is expected to occur when all load changes for two operations are uncorrelated, and indicates in relation to (−) the number of (−) signs that is expected to occur when all load changes for two operations are uncorrelated.

The sign assigning unit 31 generates sign assigning information corresponding to the operations by assigning a sign to load changes in a plurality of operations stored in the load change storage unit 11. More specifically, a median is calculated every hour as an example of a typical value for the load value of each operation, and the load value of each operation is assigned a sign depending on whether the load value of each operation is greater than or less than the median. For example, a load value is assigned (+) when greater than the median, and (−) when less than the median. Signs generated in this way are referred to below as load value signs. In the present embodiment, the sign information is used as an example of change status information indicating a change in the load of each of a plurality of virtual resources, and the sign assigning unit 31 is an example of an acquisition unit for acquiring change status information. The sign information consisting of load value signs is also an example of post-change value information indicating the value after a change in each load of a plurality of virtual servers, and the sign assigning unit 31 is also an example of a second acquisition unit for acquiring post-change value information.

The sign information storage unit 32 stores the sign information corresponding to the plurality of operations generated by the sign assigning unit 31.

The sign product calculating unit 33 extracts from the sign information corresponding to the plurality of operations stored in the sign information storage unit 32 the sign information corresponding to the two operations selected by the control unit 12, and generates sign product information by calculating the product of the load value signs in the sign information corresponding to each operation. The sign product is (+) when the load value sign of one operation is (+) and the load value sign of the other operation is (+) and when the load value sign of one operation is (−) and the load value sign of the other operation is (−). The sign product is (−) when the load value sign of one operation is (+) and the load value sign of the other operation is (−). In the present embodiment, the calculation of the product of the load value signs is an example of the process of referencing the occurrence values which are greater than a predetermined typical value and values which are less than a predetermined typical value.

The sign product information storage unit 34 stores the sign product information generated by the sign product calculating unit 33.

The $\chi 2$ test unit 35 performs an $\chi 2$ test on the sign product information stored in the sign product information storage unit 34. In other words, it performs a test to determine whether or not there is a large discrepancy in the number of (+) and (−) signs in the sign product information. When the test value exceeds a predetermined reference, information indicating a correlation is returned to the control unit 12. When the test value does not exceed the predetermined reference, information indicating no correlation is returned to the control unit 12. In the present embodiment, the $\chi 2$ test unit 35 is an example of a determination unit for determining whether or not there is a high correlation between changes in each load of the plurality of resources or a second determination unit for determining whether or not there is a high linkage in the values after the change in each of the loads of the plurality of virtual servers. Because the $\chi 2$ test was described in the explanation of $\chi 2$ test unit 25, further explanation has been omitted.

These function units are realized by software and hardware resources working together. More specifically, the CPU 90*a* (see FIG. 9) realizes these function units by reading a program realizing the control unit 12, the sign assigning unit 21, the sign product calculating unit 23, the $\chi 2$ test unit 25, the sign assigning unit 31, the sign product calculating unit 33, and the χ2 test unit 35 from the magnetic disk device 90g (see FIG. 9) to the main memory 90c (see FIG. 9) and then executing the program. The load change storage unit 11, determination result storage unit 13, sign information storage unit 22, sign product information storage unit 24, sign information storage unit 32, and sign product information storage unit 34 are realized by the magnetic disk device 90g (see FIG. 9).

Figure 2:
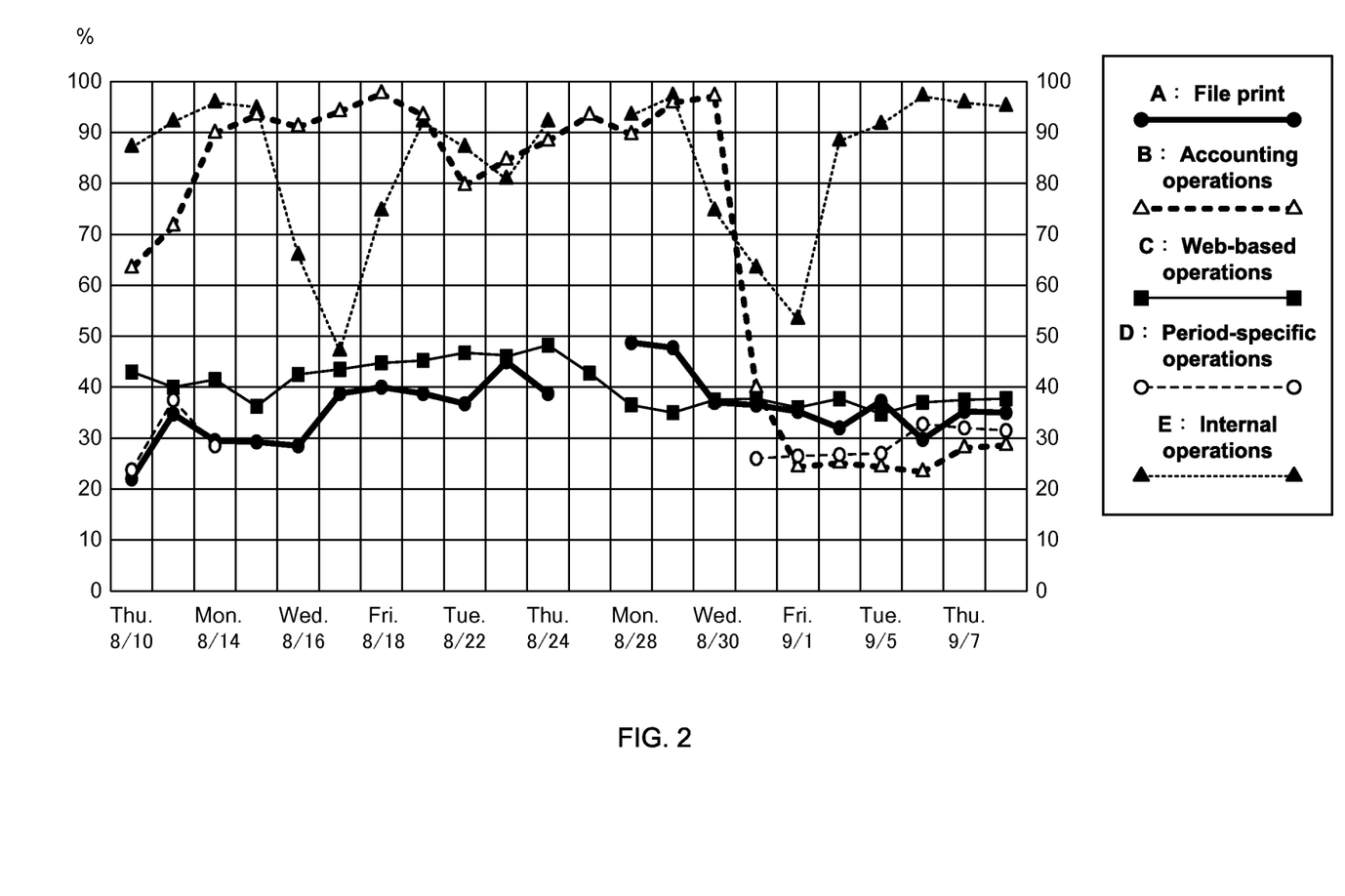
FIG. 2 is a diagram showing an example of load changes among operations.

The following is an explanation of examples of information stored in each storage unit of the allocation decision support device 10. FIG. 2 is a diagram showing an example of the load changes for each operation stored in the load change storage unit 11. The loads of each operation at each hour are stored as numerical values in the load change storage device 11. Here, a graph makes it easier to visually grasp the changes in the loads of each operation over time. In this example, days are used instead of hours as the timing for measuring loads. The changes in the loads of operations A-E are graphed for each server operating day from August 10th to September 8th, excluding Saturday and Sunday. There are some server operating days during which some of the operations were not executed. For example, operations A and E were not executed on August 25th, and operation D was not operated from August 15th to August 30th.

Figure 3:
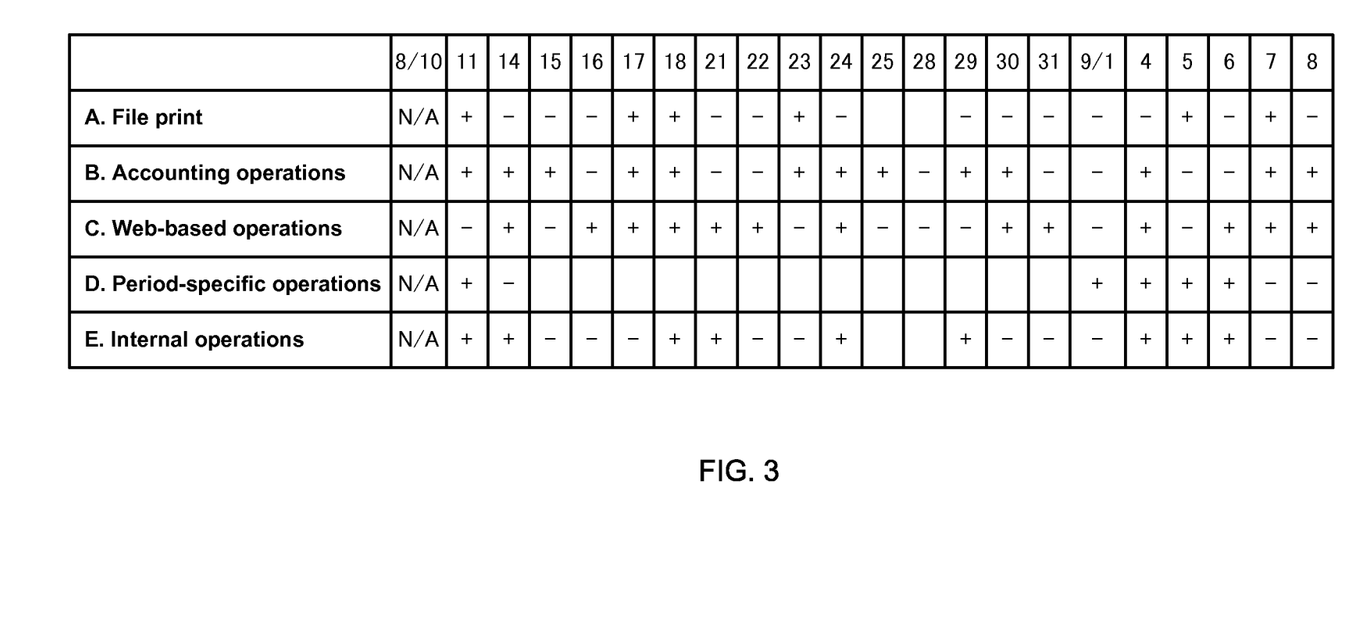
FIG. 3 is a diagram showing sign information consisting of load vector signs in which load changes in operations are assigned a sign depending on whether the load value has increased or decreased.

FIG. 3 is a diagram showing sign information stored in the sign information storage unit 22. The sign information is load vector signs. Every day, the load change for each of operations A-E was assigned a sign based on whether the load value of the operation had risen or fallen relative to the value for the previous day. More specifically, a (+) sign was assigned when the load value rose, and a (−) sign was assigned when the load value fell. "N/A" was assigned on days lacking a load value for the previous day.

Figure 4:
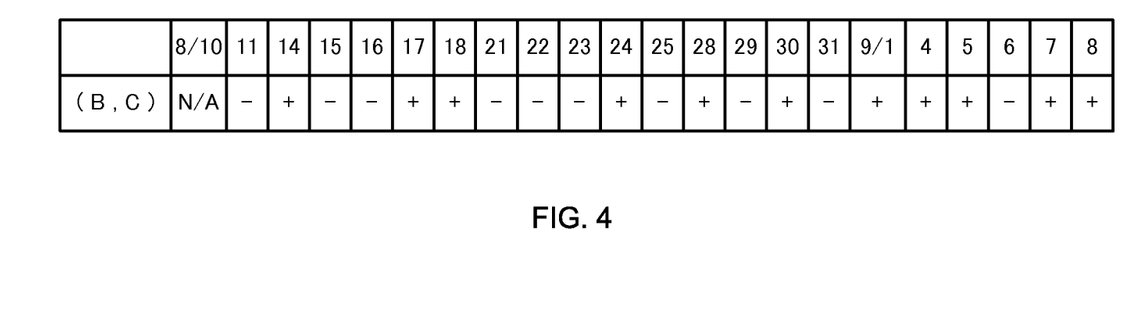
FIG. 4 is a diagram showing sign product information consisting of load vector sign products in which load changes in operations are assigned a sign depending on whether the load value has increased or decreased.

FIG. 4 shows sign product information stored in the sign product information storage unit 24. The sign product information consists of the product of the load vector signs of two operations. In this example, the two operations are operation B and operation C, and the sign product is the product of the load vector sign of operation B and the load vector sign of operation C. For example, because the load vector sign for operation B was (+) and the load vector sign of operation C was (−) on August 11th in FIG. 3, the sign product is (−) for August 11th in FIG. 4.

When there is a load change correlation between two operations, the load value of one of the operations tends to rise on a given day and the load vector sign is (+), the load value of the other operation also tends to rise and the load vector sign should be (+). When the load value of one of the operations tends to fall and the load vector sign is (−), the load value of the other operation also tends to fall and the load vector sign should be (−). Because the product of the load vector signs is (+) in the case of both (+)×(+) and (−)×(−), a load vector sign product of (+) for two operations is considered to be a positive correlation. When there is a negative correlation or no correlation and the load value of one of the operations tends to rise on a given day and the load vector sign is (+), then the load value of the other operation tends to fall and the load vector sign is expected to be (−). At this time, the product of the load vector signs is (+)×(−) or (−).

When, in FIG. 4, the product of the load vector sign of operation B and the load vector sign of operation C is calculated for each of 21 days, 11 results are (+) and 10 are (−). When there is no correlation between operation B and operation C in terms of load changes, the results are not biased towards either (+) or (−), and the expected value for the occurrences of (+) and (−) is 10.5. Thus, an χ2 test is performed to determine the magnitude of the discrepancy. When the discrepancy is 1% or less and the correlation is very high, the test value is 6.63 or greater. When the discrepancy is 5% or less and a correlation exists, the test value is 3.84 or greater. Therefore, when the test value is less than 3.84, it can be determined that there is a low correlation. In other words, when an χ2 test is performed on the sign products of operations B and C in FIG. 4, the result is (11−10.5)2/10.5+(10−10.5)2/10.5=0.05<3.84. This means no correlation can be found between operations B and C in terms of load changes.

Figure 5:
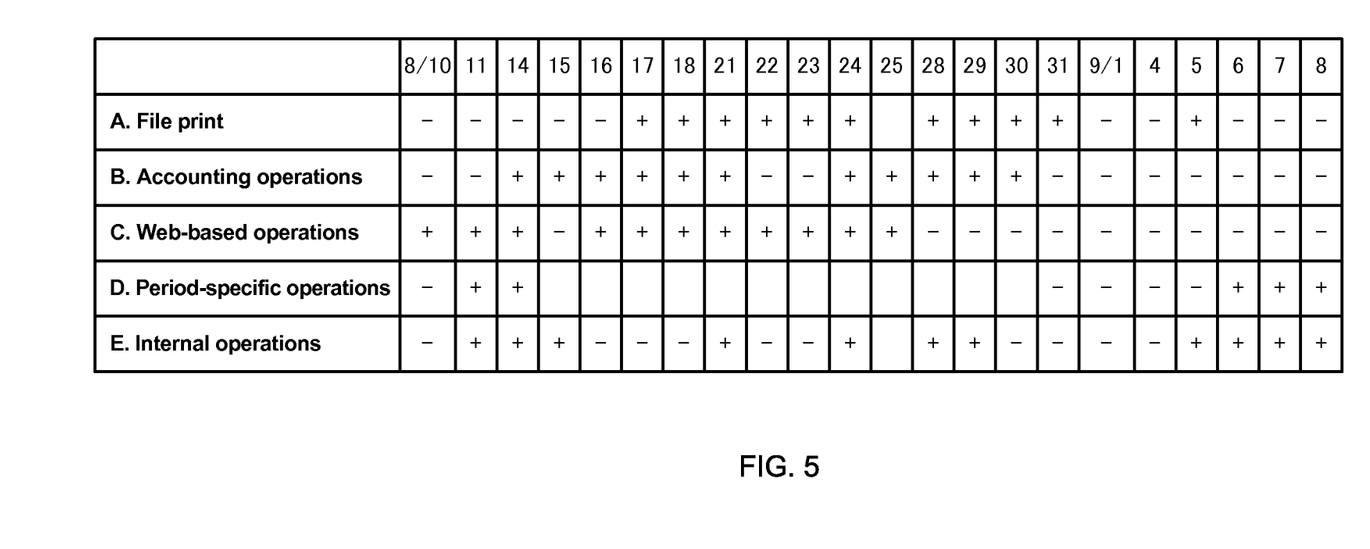
FIG. 5 is a diagram showing sign information consisting of load vector signs in which load changes in operations are assigned a sign depending on whether the load value is greater than or less than the median.

FIG. 5 shows the sign information stored in the sign information storage unit 32. This sign information is load value signs. Each day, a sign is assigned to the load change of each of operations A-E depending on whether the load value of each operation is above or below a median line. More specifically, if a load value is above the median line, (+) is assigned. If a load value is below the median line, (−) is assigned. When the load value is equal to the median, (+) is assigned for convenience. In the case of operations B, C and D, the number of load values is even, none of the load values is equal to the median, and the number of (+) and (−) signs is the same. In the case of operations A and E, the number of load values is odd, one of the load values is equal to the median, and there is one more (+) sign than (−) sign.

Figure 6:
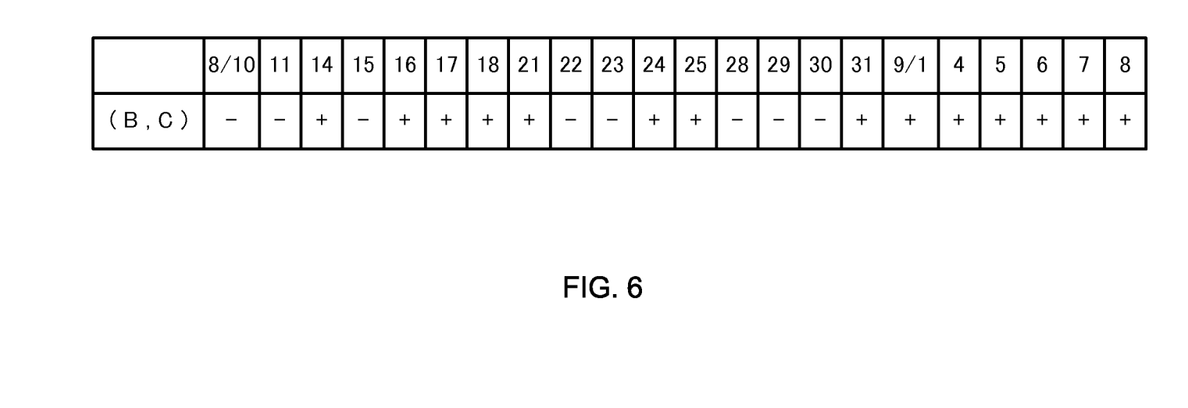
FIG. 6 is a diagram showing sign product information consisting of load vector sign products in which load changes in operations are assigned a sign depending on whether the load value is greater than or less than the median.

FIG. 6 is a diagram showing the sign product information stored in the sign product information storage unit 34. The sign product information is the product of the load value signs of two operations. In this example, the two operations are operation B and operation C, and the sign product is the product of the load value sign of operation B and the load value sign of operation C. For example, because the load value sign of operation B is (−) and the load value sign of operation C is (+) on August 10th in FIG. 5, the sign product is (−) on August 10th in FIG. 6.

When there is a load change correlation between two operations, the load value of one of the operations tends to be above the median line on a given day and the load value sign is (+), the load value of the other operation also tends to be above the median line and the load value sign should be (+). When the load value of one of the operations is below the median line and the load value sign is (−), the load value of the other operation also tends to be below the median line and the load value sign should be (−). Because the product of the load value signs is (+) in the case of both (+)×(+) and (−)×(−), a load value sign product of (+) for two operations is considered to be a positive correlation. When there is a negative correlation or no correlation and the load value of one of the operations tends to be above the median line on a given day and the load value sign is (+), then the load value of the other operation tends to be below the median line and the load value sign is expected to be (−). At this time, the product of the load value signs is (+)×(−) or (−).

When, in FIG. 6, the product of the load value sign of operation B and the load value sign of operation C is calculated for each of 22 days, 14 results are (+) and 8 are (−). When there is no correlation between operation B and operation C in terms of load changes, the results are not biased towards either (+) or (−), and the expected value for the occurrences of (+) and (−) is 11. Thus, an χ2 test is performed to determine the magnitude of the discrepancy. When an χ2 test is performed on the sign products of operations B and C in FIG. 6, the result is (14−11)2/11+(8−11)2/11=1.64<3.84. This means a low correlation can be found between operations B and C in terms of load changes.

Figure 7:
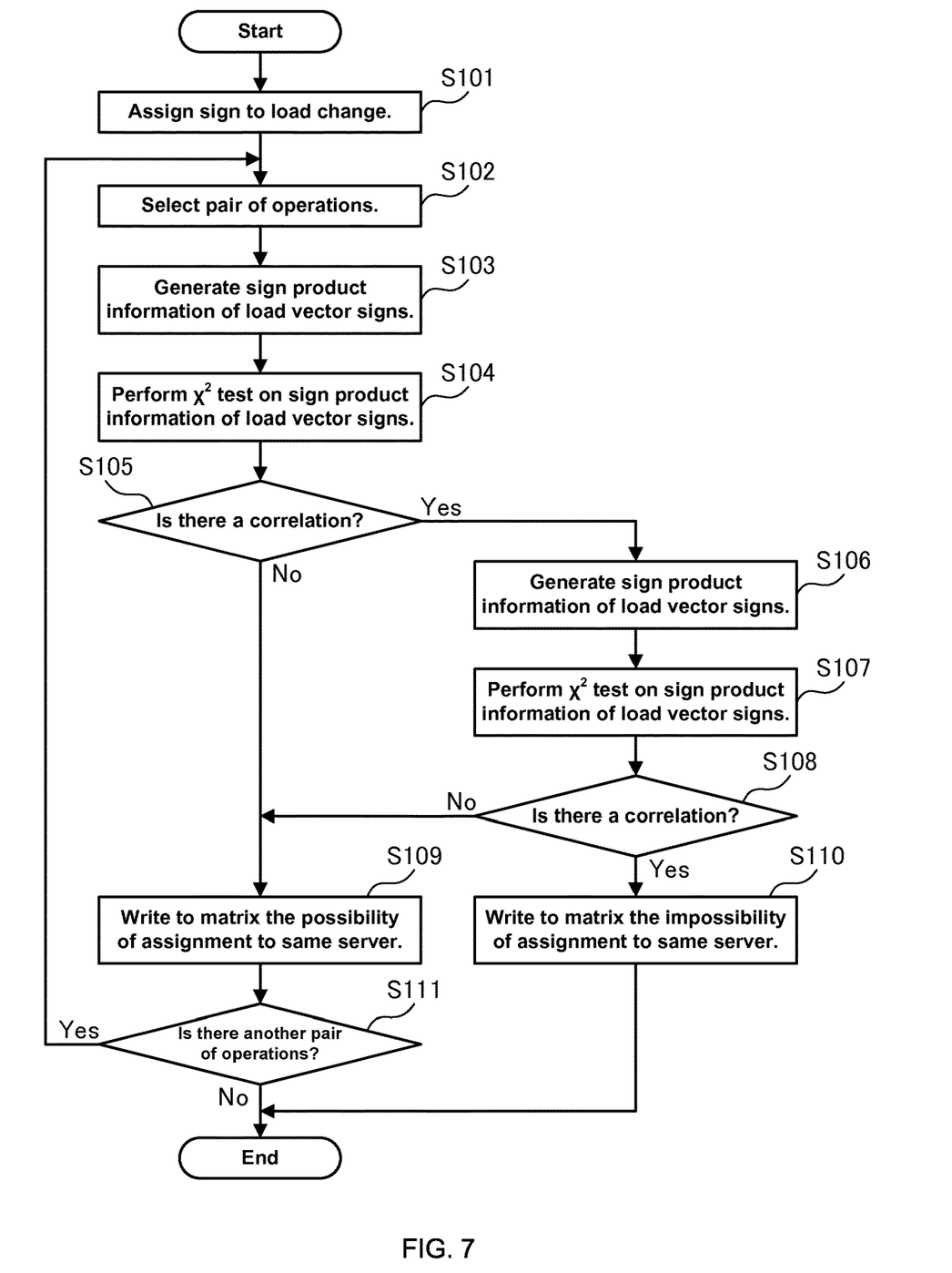
FIG. 7 is a flowchart showing an example of operations performed by the allocation decision support device in an embodiment of the present invention.

The following is an explanation of the operations performed by the allocation decision support device 10. FIG. 7 is a flowchart showing an example of operations performed by the allocation decision support device 10. As shown in the drawing, the sign assigning units 21, 31 of the allocation decision support device 10 generate sign information by assigning signs to the load changes stored in the load change storage unit 11 (Step 101). More specifically, the sign assigning unit 21 generates sign information consisting of load vector signs depending on whether the load value of each operation during every hour has risen above or fallen below the load value of the previous hour, and stores this sign information in the sign information storage unit 22. For example, the sign information shown in FIG. 3 is stored in the sign information storage unit 22. The sign assigning unit 31 generates sign information consisting of load value signs depending on whether the load value of each operation every hour is above or below the median load value of each operation, and stores this sign information in the sign information storage unit 32. For example, the sign information shown in FIG. 5 is stored in the sign information storage unit 32.

Next, the control unit 12 determines whether or not pairs of all of the operations included among the plurality of operations may be placed in the same server. In other words, the control unit 12 first selects a pair of operations from among the plurality of operations (Step 102).

Next, the control unit 12 executes the sign product calculating unit 23 and the $\chi 2$ test unit 25 to determine using the load vector signs whether or not there is a correlation between the operations in terms of load change. In other words, the control unit 12 instructs the sign product calculating unit 23 to generate sign product information by calculating the product of the load vector signs (Step 103). More specifically, the sign product calculating unit 23 extracts the sign information corresponding to the pair of operations selected in Step 102 from the sign information stored in the sign information storage unit 22. Next, the product of the load vector sign in the sign information corresponding to one of the operations and the load vector sign in the sign information corresponding to the other operation is calculated, and sign product information consisting of the sign product is stored in the sign product information storage unit 24. For example, when operation B and operation C are selected in Step 102, the sign product information shown in FIG. 4 is stored in the sign product information storage unit 24. Next, the control unit 12 instructs the $\chi 2$ test unit 25 to perform a $\chi 2$ test on the sign product information stored in the sign product information storage unit 24, and send to the control unit 12 the test results indicating whether or not there is a correlation between the operations selected in Step 102 with respect to load change (Step 104). For example, when operation B and operation C are selected in Step 102 and the sign product information shown in FIG. 4 is stored in the sign product information storage unit 24, test results indicating that there is no correlation between operation B and operation C are returned to the control unit 12.

In this way, the control unit 12 determines whether or not there is a correlation between the operations selected in Step 102 in terms of load change (Step 105). More specifically, it determines from the results returned by the $\chi 2$ test unit 25 whether or not there is a correlation. As a result, it determines that there is a load change correlation between the operations selected in Step 102. More specifically, the test results returned by the $\chi 2$ test unit 25 indicate that there is a correlation.

In this case, the control unit 12 has the sign product calculating unit 33 and the $\chi 2$ test unit 35 to determine using the load value signs whether or not there is a correlation between the operations selected in Step 102 in terms of load change. Here, the control unit 12 instructs the sign product calculating unit 33 to generate sign product information by calculating the product of the load value signs (Step 106). More specifically, the sign product calculating unit 33 extracts the sign information corresponding to the pair of operations selected in Step 102 from the sign information stored in the sign information storage unit 32. The product of the load value sign in the sign information corresponding to one operation and the load value sign in the sign information corresponding to the other operation is extracted, and sign product information consisting of a sign product is stored in the sign product information storage unit 34. For example, when operation B and operation C are selected, the sign product information shown in FIG. 6 is stored in the sign product information storage unit 34. Next, the control unit 12 instructs the $\chi 2$ test unit 35 to perform a $\chi 2$ test on the sign product information stored in the sign product information storage unit 34, and return test results indicating whether or not there is a correlation between the operations selected in Step 102 in terms of load change to the control unit 12 (Step 107). For example, when operation B and operation C are selected in Step 102 and the sign product information in FIG. 6 is stored in the sign product information storage unit 34, test results indicating that there is no correlation between operation B and operation C in terms of load change are returned to the control unit 12.

In this way, the control unit 12 determines whether or not there is a correlation between the operations selected in Step 102 in terms of load change (Step 108). More specifically, the test results returned by the $\chi 2$ test unit 35 indicate that there is a correlation.

When it is determined in Step 105 that there is no correlation or it is determined in Step 108 that there is no correlation, the control unit 12 stores in the determination result storage unit 13 information indicating that the operations selected in Step 102 may be located in the same server (Step 109).

When it is determined in Step 108 that there is a correlation, the control unit 12 stores in the determination result storage unit 13 information indicating that the operations selected in Step 102 may be located in the same server (Step 110).

Afterwards, the control unit 12 determines whether a pair of operations has still not been selected from among the plurality of operations (Step 111). If a pair of operations still remains, the process advances to Step 102. If there are no more pairs of operations, the process is ended.

In this operational example, it was determined whether or not there was a correlation between the operations selected in Step 102 using load value signs after the same had been determined using load vector signs. However, the determination operations do not have to be determined in this order. For example, it can be determined whether or not there is a correlation between the operations using load vector signs after the same had been determined using load value signs, or the determination using load vector signs and the determination using load value signs can be performed concurrently.

In this operational example, it was determined that the operations selected in Step 102 may be located on the same server when no correlation was discovered using sign vector signs or no correlation was discovered using load value signs, and it was determined that the operations selected in Step 102 should not be located on the same server when a correlation was discovered using sign vector signs and a correlation was discovered using load value signs. However, the present invention is not limited to this example. For example, it can be determined that the operations selected in Step 102 may be located on the same server when no correlation is discovered using sign vector signs and no correlation is discovered using load value signs, and it can be determined that the operations selected in Step 102 should not be located on the same server when a correlation is discovered using sign vector signs or a correlation is discovered using load value signs. A determination can also be made using either load vector signs or load value signs. When a correlation is not discovered, it is determined that the operations selected in Step 102 may be located on the same server. When a correlation is discovered, it is determined that the operations selected in Step 102 should not be located on the same server.

Figure 8:
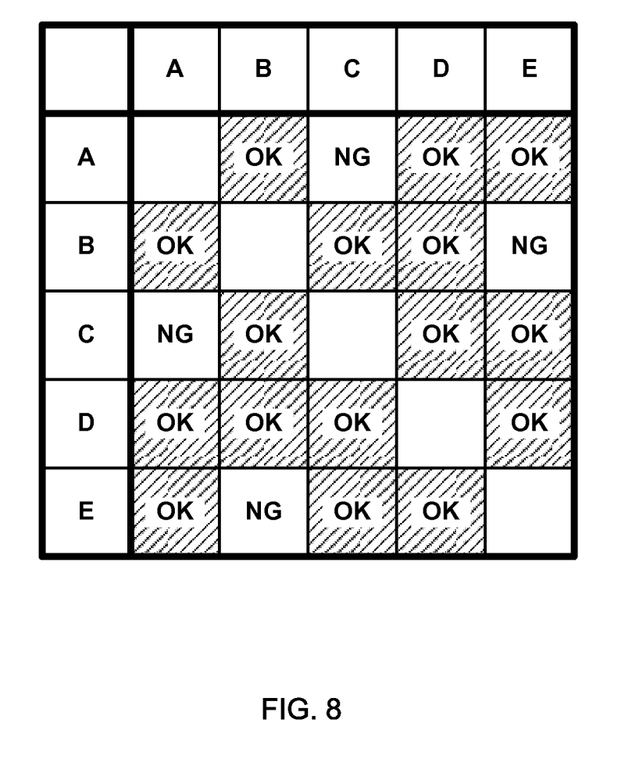
FIG. 8 is a diagram showing determination results regarding whether or not operations can be assigned to the same server.

The following is an explanation of the information stored in the determination result storage unit 13 in Step 109 and Step 110. FIG. 8 is a diagram showing the determination results stored in the determination result storage unit 13. As shown in the drawing, the determination results are stored in matrix format. In this matrix, information indicating whether or not two different operations may be located on the same server is stored in the cell where the row corresponding to one operation intersects the column corresponding to the other operation. In this diagram, "OK" indicates that the two operations may be located on the same server, and "NG" indicates that the two operations should not be located on the same server. For example, because "OK" is displaced in the cell where the row for operation A intersects the column for operation B, it is determined that operations A and B may be located in the same server.

The allocation decision support device 10 may present this matrix to the user. Here, combinations of three operations from among operations A-E that can be located on the same server are determined and presented to the user.

For example, it can determine whether or not operations A, B and C may be located on the same server. In the matrix, operation A and operation B may be located on the same server, operation B and operation C may be located on the same server, but operation A and operation C should not be located on the same server. Therefore, the allocation decision support device 10 presents to the user information indicating that operations A, B and C should not be located on the same server. It can also determine whether or not operations A, B and E may be located on the same server. In the matrix, operation A and operation B may be located on the same server, operation A and operation E may be located on the same server, but operation B and operation E should not be located on the same server. Therefore, the allocation decision support device 10 presents to the user information indicating that operations A, B and E should not be located on the same server.

It can also determine whether or not operations A, B and D may be located on the same server. In the matrix, operation A and operation B may be located on the same server, operation B and operation D may be located on the same server, and operation A and operation D may be located on the same server. Therefore, the allocation decision support device 10 presents to the user information indicating that operations A, B and D may be located on the same server.

The present embodiment is premised on the notion that load changes acquired from the servers have already been stored in a load change storage unit 11. However, functions may be installed in the allocation decision support device 10 to monitor the operating conditions of servers and acquire load changes. In the present embodiment, the allocation decision support device 10 presents to the user information related to combinations of operations that can be located on the same server. However, the combinations of operations that can be located on the same server may be performed until the process of actually locating the operations on servers.

In the present embodiment, as described above, the correlation between a plurality of operations in terms of load changes is determined based on whether or not the directions in which the loads change tend to resemble each other and whether the relationships of the load values to the median tend to resemble each other. When there is no correlation, it is decided that the plurality of operations may be located on the same server. When there is a correlation, it is determined that the plurality of operations should not be located on the same server. In this way, the proper allocation of operations relative to servers can be determined so that business processing capacity does not decline even when a load spike occurs.

Figure 9:
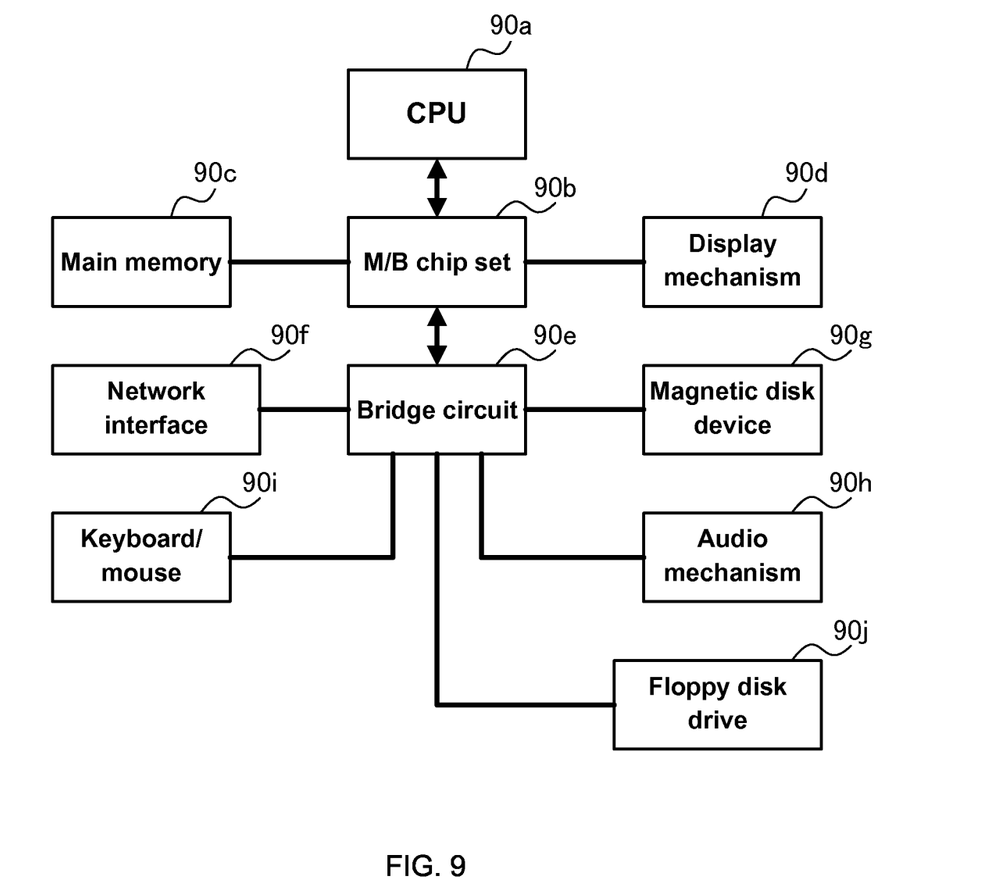
FIG. 9 is a diagram showing an example of a computer hardware configuration that can be applied to an embodiment of the present invention.

Finally, a preferred computer hardware configuration will be explained for embodiment of the present invention. FIG. 9 is a diagram showing an example of such a computer hardware configuration. As shown in the drawing, the computer includes a central processing unit (CPU) 90a serving as a computing means, a main memory 90c connected to the CPU 90a via a motherboard (M/B) chip set 90b, and a display mechanism 90d connected to the CPU 90a via the same M/B chip set 90b. A network interface 90f, magnetic disk device (HDD) 90g, audio mechanism 90h, keyboard/mouse 90i, and floppy disk drive 90j are also connected to the M/B chip set 90b via a bridge circuit 90e.

In FIG. 9, the various configurational elements are connected via a bus. For example, the CPU 90a and the M/B chip set 90b, and the M/B chip set 90b and the main memory 90c are connected via a CPU bus. Also, the M/B chip set 90b and the display mechanism 90d may be connected via an accelerated graphics port (AGP). However, when the display mechanism 90d includes a PCI express-compatible video card, the M/B chip set 90b and the video card are connected via a PCI express (PCIe) bus. Also, PCI Express can be used as the network interface 90f if, for example, it is connected to the bridge circuit 90e. Examples of magnetic disk drives 90g include a serial AT attachment (ATA), a parallel-transmission ATA, and peripheral components interconnect (PCI). The keyboard/mouse 90i and the floppy disk drive 90j can use a universal serial bus (USB).

Here, the present invention can be realized using all hardware or all software. It can also be realized using a combination of both hardware and software. The present invention can also be realized as a computer, data processing system, or computer program. The computer program can be stored and distributed on a computer-readable medium. Here, the medium can be electronic, magnetic, optical, mechanical, infrared, or a semiconductor system (device or equipment). It can also be propagation medium. Examples of computer-readable media include semiconductors, solid-state storage devices, magnetic tape, removable computer diskettes, random-access memory (RAM), read-only memory (ROM), rigid magnetic disks, and optical disks. Examples of optical disks at the present time include compact disk read-only memory (CD-ROM) disks, compact disk read/write (CD-R/W) disk, and DVDs.

The present invention was explained above using an embodiment, but the technical scope of the present invention is not limited in any way by this embodiment. It should be clear to a person of skill in the art that various modifications and substitutions can be made without departing from the spirit and scope of the present invention.

What is claimed is:

1. A method of relocating virtual resource into a single physical resource, comprising:

acquiring, for each of a plurality of candidate virtual resources, change status information indicating a change in a load for each of the respective plurality of candidate virtual resources;

performing a first statistical processing on the change status information for the plurality of candidate virtual resources to determine whether a high correlation exists between changes in the loads of the plurality of candidate virtual resources;

performing a second statistical processing on the change status information for the plurality of candidate virtual resources to determine whether a high correlation exists between load values above or below a median line in the loads of the plurality of candidate virtual resources; and locating, within the single physical resource and based upon both the first and second statistical processing, the plurality of candidate virtual resources in the single physical resource.

2. The method of claim 1, wherein
the locating is based upon a determination that the high correlation does not exist the changes in the loads of the plurality of candidate virtual resources.

3. The method of claim 1, wherein
the change status information for a particular one of the plurality of candidate virtual resources indicates a direction of change in a location for the particular one, and
the determining in the second statistical processing is based upon referencing occurrences of a rise or a fall in the directions of change for the loads of each of the plurality of candidate virtual resources.

4. The method of claim 3, wherein
the high correlation is determined to exist based upon the directions of change in some of the plurality of virtual resources are in a rising or falling direction during a same period of time.

5. The method of claim 1, wherein
the change status information for a particular one of the plurality of candidate virtual resources indicates a value after a change in a load of the particular one, and
the determining in the second statistical processing is based upon referencing occurrences between values which are greater than or less than a predetermined typical value.

6. The method of claim 5, wherein
the high correlation is determined to exist based upon values in some of the plurality of virtual resources are greater than or less than the predetermined typical value during a same period of time.

7. A computer hardware system configured to relocate virtual resource into a single physical resource, comprising:

a hardware processor programmed to initiate the following executable operations:

acquiring, for each of a plurality of candidate virtual resources, change status information indicating a change in a load for each of the respective plurality of candidate virtual resources;

performing a first statistical processing on the change status information for the plurality of candidate virtual resources to determine whether a high correlation exists between changes in the loads of the plurality of candidate virtual resources;

performing a second statistical processing on the change status information for the plurality of candidate virtual resources to determine whether a high correlation exists between load values above or below a median line in the loads of the plurality of candidate virtual resources; and locating, within the single physical resource and based upon both the first and second statistical processing, the plurality of candidate virtual resources in the single physical resource.

8. The system of claim 7, wherein
the locating is based upon a determination that the high correlation does not exist the changes in the loads of the plurality of candidate virtual resources.

9. The system of claim 7, wherein
the change status information for a particular one of the plurality of candidate virtual resources indicates a direction of change in a location for the particular one, and
the determining in the second statistical processing is based upon referencing occurrences of a rise or a fall in the directions of change for the loads of each of the plurality of candidate virtual resources.

10. The system of claim 9, wherein
the high correlation is determined to exist based upon the directions of change in some of the plurality of virtual resources are in a rising or falling direction during a same period of time.

11. The system of claim 7, wherein
the change status information for a particular one of the plurality of candidate virtual resources indicates a value after a change in a load of the particular one, and
the determining in the second statistical processing is based upon referencing occurrences between values which are greater than or less than a predetermined typical value.

12. The system of claim 11, wherein
the high correlation is determined to exist based upon values in some of the plurality of virtual resources are greater than or less than the predetermined typical value during a same period of time.

13. A computer program product for relocating virtual resource into a single physical resource, comprising:

a computer readable storage hardware device having program code stored thereon, the program code executable by a hardware processor to perform:

acquiring, for each of a plurality of candidate virtual resources, change status information indicating a change in a load for each of the respective plurality of candidate virtual resources;

performing a first statistical processing on the change status information for the plurality of candidate virtual resources to determine whether a high correlation exists between changes in the loads of the plurality of candidate virtual resources;

performing a second statistical processing on the change status information for the plurality of candidate virtual resources to determine whether a high correlation exists between load values above or below a median line in the loads of the plurality of candidate virtual resources; and locating, within the single physical resource and based upon both the first and second statistical processing, the plurality of candidate virtual resources in the single physical resource.

14. The computer program product of claim 13, wherein the locating is based upon a determination that the high correlation does not exist the changes in the loads of the plurality of candidate virtual resources.

15. The computer program product of claim 13, wherein
the change status information for a particular one of the plurality of candidate virtual resources indicates a direction of change in a location for the particular one, and
the determining in the second statistical processing is based upon referencing occurrences of a rise or a fall in the directions of change for the loads of each of the plurality of candidate virtual resources.

16. The computer program product of claim 15, wherein the high correlation is determined to exist based upon the directions of change in some of the plurality of virtual resources are in a rising or falling direction during a same period of time.

17. The computer program product of claim 13, wherein
the change status information for a particular one of the plurality of candidate virtual resources indicates a value after a change in a load of the particular one, and
the determining in the second statistical processing is based upon referencing occurrences between values which are greater than or less than a predetermined typical value.

18. The computer program product of claim 17, wherein the high correlation is determined to exist based upon values in some of the plurality of virtual resources are greater than or less than the predetermined typical value during a same period of time.

* * * * *